(12) United States Patent
Taylor et al.

(10) Patent No.: US 7,255,004 B2
(45) Date of Patent: Aug. 14, 2007

(54) WIRELESS FLUID LEVEL MEASURING SYSTEM

(75) Inventors: Bryant D. Taylor, Smithfield, VA (US); Stanley E. Woodard, Hampton, VA (US)

(73) Assignee: United States of America as represented by the Administrator of the National Aeronautics and Space Administration, Washington, DC (US)

(*) Notice: Subject to any disclaimer, the term of this patent is extended or adjusted under 35 U.S.C. 154(b) by 191 days.

(21) Appl. No.: 11/229,438

(22) Filed: Sep. 12, 2005

(65) Prior Publication Data

US 2006/0053880 A1   Mar. 16, 2006

Related U.S. Application Data

(60) Provisional application No. 60/609,510, filed on Sep. 13, 2004.

(51) Int. Cl.
*G01F 23/26* (2006.01)
(52) U.S. Cl. .................................................. 73/304 C
(58) Field of Classification Search ............... 73/304 C
See application file for complete search history.

(56) References Cited

U.S. PATENT DOCUMENTS

| | | | |
|---|---|---|---|
| 3,343,415 A | 9/1967 | Johnston et al. | |
| 4,122,718 A | 10/1978 | Gustafson | |
| 4,553,434 A | 11/1985 | Spaargaren | |
| 5,001,596 A | 3/1991 | Hart | |
| 5,103,368 A | 4/1992 | Hart | |
| 5,437,184 A | 8/1995 | Shillady | |
| 6,125,696 A | 10/2000 | Hannan et al. | |
| 6,293,142 B1 | 9/2001 | Pchelnikov et al. | |
| 6,335,690 B1 | 1/2002 | Konchin et al. | |
| 6,539,797 B2 | 4/2003 | Livingston et al. | |
| 6,546,795 B1 | 4/2003 | Dietz | |
| 6,564,658 B2 | 5/2003 | Pchelnikov et al. | |
| 6,677,859 B1 | 1/2004 | Bensen | |
| 6,802,205 B2 | 10/2004 | Barguirdjian et al. | |
| 6,823,730 B2 | 11/2004 | Buck et al. | |
| 2001/0037680 A1 | 11/2001 | Buck et al. | |
| 2003/0000303 A1 | 1/2003 | Livingston et al. | |
| 2003/0019291 A1 | 1/2003 | Pchelnikov et al. | |
| 2004/0004545 A1 | 1/2004 | Early | |
| 2004/0004550 A1 | 1/2004 | Early | |
| 2004/0004551 A1 | 1/2004 | Early | |
| 2004/0078014 A1 | 4/2004 | Shapira | |
| 2005/0007239 A1 | 1/2005 | Woodard et al. | |
| 2005/0017711 A1 | 1/2005 | Woodard et al. | |

*Primary Examiner*—Hezron Williams
*Assistant Examiner*—Paul M West
(74) *Attorney, Agent, or Firm*—Robin W. Edwards

(57) ABSTRACT

A level-sensing probe positioned in a tank is divided into sections with each section including (i) a fluid-level capacitive sensor disposed along the length thereof, (ii) an inductor electrically coupled to the capacitive sensor, (iii) a sensor antenna positioned for inductive coupling to the inductor, and (iv) an electrical conductor coupled to the sensor antenna. An electrically non-conductive housing accessible from a position outside of the tank houses antennas arrayed in a pattern. Each antenna is electrically coupled to the electrical conductor from a corresponding one of the sections. A magnetic field response recorder has a measurement head with transceiving antennas arrayed therein to correspond to the pattern of the housing's antennas. When a measurement is to be taken, the measurement head is mechanically coupled to the housing so that each housing antenna is substantially aligned with a specific one of the transceiving antennas.

28 Claims, 6 Drawing Sheets

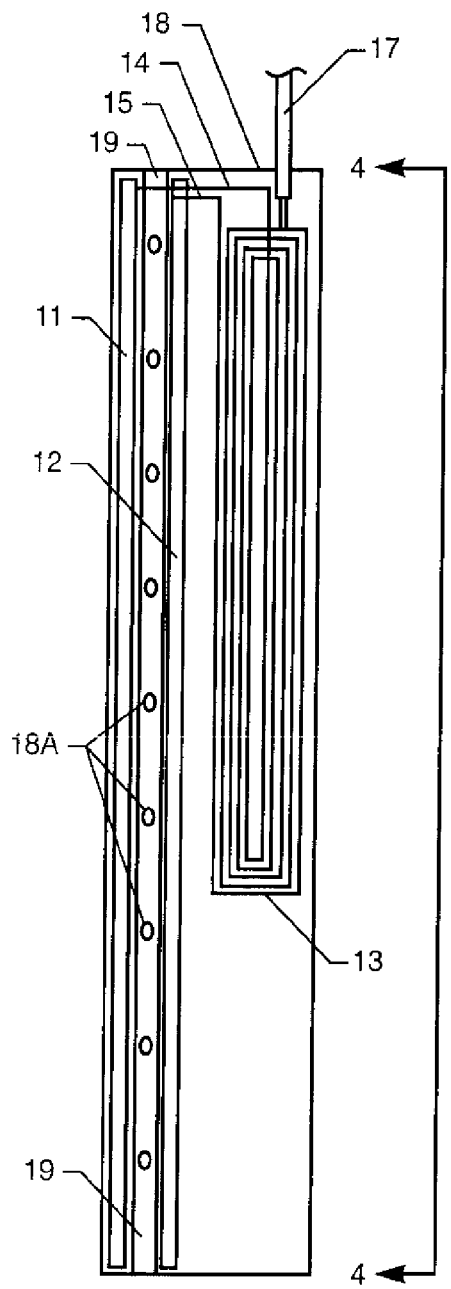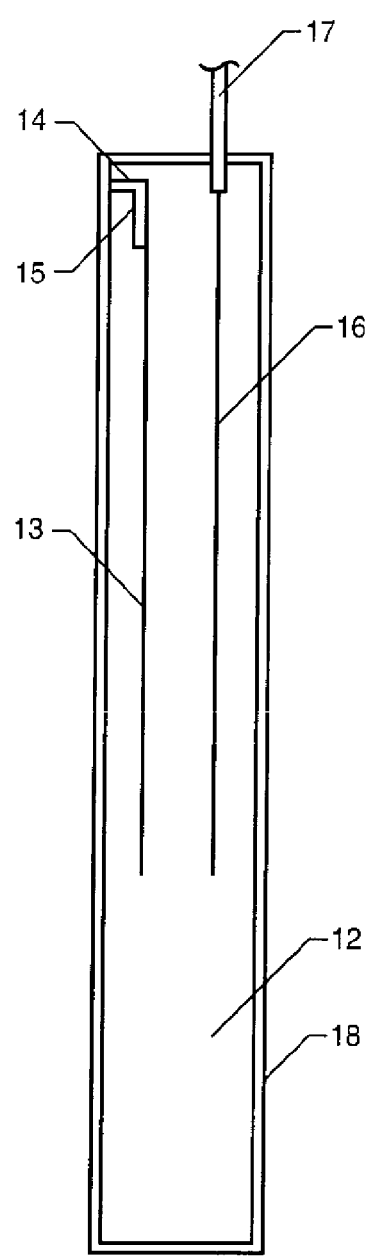
Fig. 3
Fig. 4

WIRELESS FLUID LEVEL MEASURING SYSTEM

ORIGIN OF THE INVENTION

The invention was made in part by an employee of the United States Government and may be manufactured and used by or for the Government of the United States of America for governmental purposes without the payment of any royalties thereon or therefor. Pursuant to 35 U.S.C. § 119, the benefit of priority from provisional application 60/609,510, with a filing date of Sep. 13, 2004, is claimed for this non-provisional application.

BACKGROUND OF THE INVENTION

1. Field of the Invention

This invention relates to systems for measuring levels of fluid substances in a tank. More specifically, the invention is a wireless fluid level measuring system.

2. Description of the Related Art

Fluid levels in large tanks (e.g., a filling station's gasoline storage tanks) are typically monitored by manual measurement using a dip stick. This involves removal of a tank's cover which can pose a risk to nearby personnel in terms of toxic fumes and/or the potential of an unwanted reaction/combustion of the fumes.

SUMMARY OF THE INVENTION

Accordingly, it is an object of the present invention to provide a system for measuring fluid levels in a tank.

Another object of the present invention is to provide a system that can be used to measure fluid levels in a tank without the need to access the tank each time a fluid level measurement must be collected.

Other objects and advantages of the present invention will become more obvious hereinafter in the specification and drawings.

In accordance with the present invention, a wireless system for measuring a fluid level in a tank is provided. A level-sensing probe is positioned in a tank containing a fluid such that the probe substantially spans the height of the tank. The probe is divided into a plurality of sections with each section including (i) a fluid-level capacitive sensor disposed along the length thereof, (ii) an inductor electrically coupled to the capacitive sensor, (iii) a sensor antenna positioned for inductive coupling to the inductor, and (iv) an electrical conductor coupled to the sensor antenna. An electrically non-conductive housing accessible from a position outside of the tank houses a plurality of housing antennas arrayed in a pattern. Each housing antenna is electrically coupled to the electrical conductor from a corresponding one of the sections. A magnetic field response recorder has a measurement head with transceiving antennas arrayed therein to correspond to the pattern of housing antennas. The measurement head is mechanically coupled to the housing so that each housing antenna is substantially aligned with a specific one of the transceiving antennas.

BRIEF DESCRIPTION OF THE DRAWINGS

FIG. 3 is a side view of a section housing having the section's electrical components mounted therein;

FIG. 4 is a view of the section housing taken along lines 4-4 of FIG. 3;

DETAILED DESCRIPTION OF THE INVENTION

Figure 1:
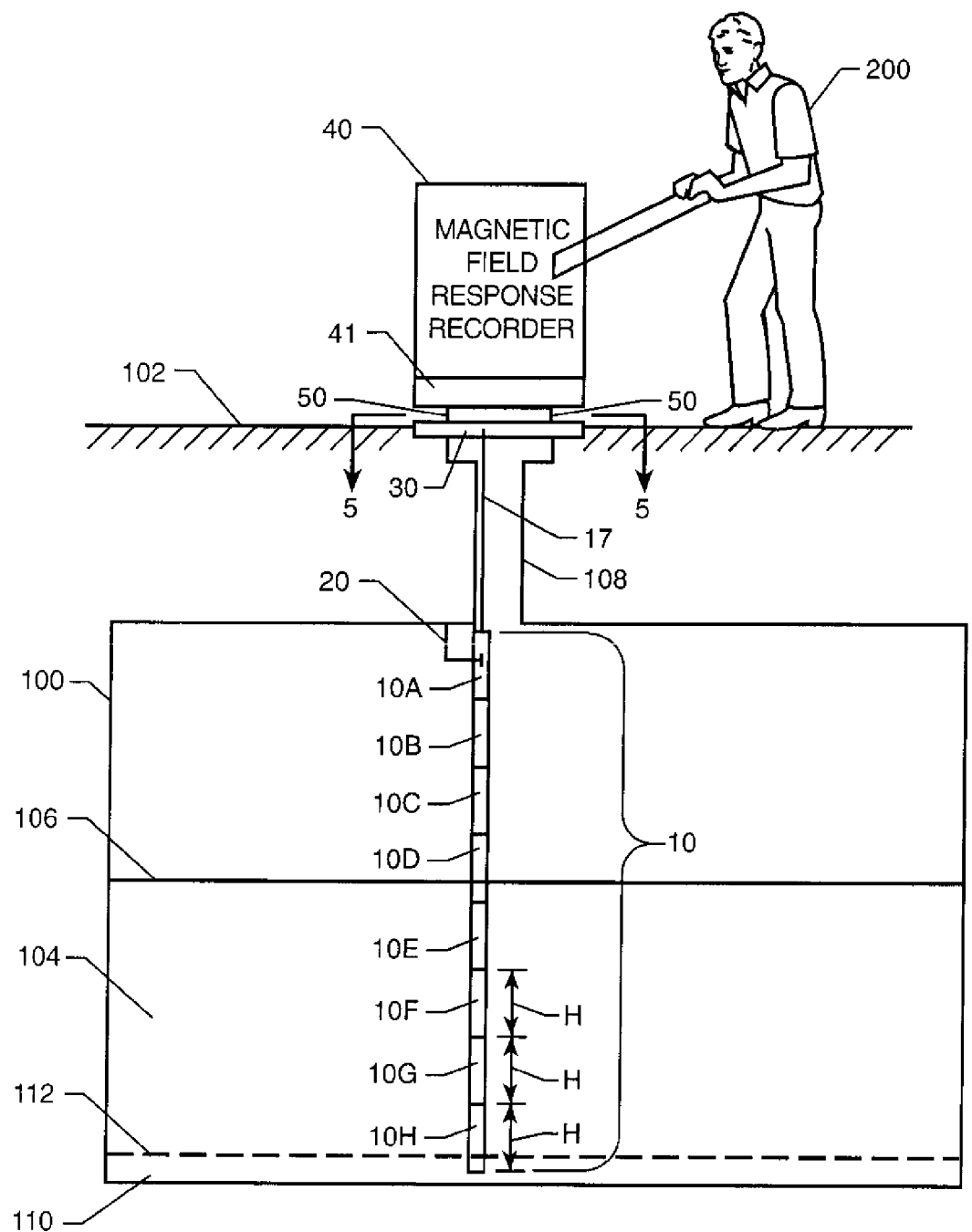
FIG. 1 is a schematic view of a fluid level measuring system in accordance with an embodiment of the present invention for measuring fluid levels in an underground tank.

Referring now to the drawings, and more particularly to FIG. 1, an embodiment of a fluid level measuring system in accordance with the present invention is shown installed in a tank 100 for measuring fluid levels therein. As used herein, the term "fluid" includes gases, liquids (including cryogenic liquids), fluent media such as powders or granular products, and amorphous media that conforms to the shape of its container. In the illustrated embodiment, tank 100 is located under the ground surface 102. By way of-a non-limiting example, tank 100 can be a gasoline tank that stores gasoline 104 therein with the level of gasoline 104 indicated by line 106. Gasoline 104 is deposited in tank 100 via a fill tube 108 that extends up to ground surface 102. It is to be understood that the present invention is not limited to use with gasoline storage tanks or underground storage tanks as any fluid-containing tank could have the tank's fluid levels measured using the present invention. Further, as will be explained later herein, the present invention can be adapted to detect/measure the level of a denser and higher dielectric fluid 110 (e.g., water when tank 100 stores gasoline 104), the level of which is indicated by dashed line 112.

The following description of FIG. 1 will provide a brief overview of the fluid level measuring system as it relates to detecting/measuring level 106 while assuming that none of fluid 110 is present. A probe 10 is positioned in tank 100 such that it is oriented substantially perpendicular to level 106 that is determined by gravity. Such mechanical positioning of probe 10 can be accomplished in a variety of ways without departing from the scope of the present invention. For example, a mechanical hanger 20 could be used to hang probe 10 from tank 100. Probe 10 can also be hung from a cover 30 used to close off/seal fill tube 108 at ground surface 102. Probe 10 should substantially span the fillable height of tank 100 as shown. Probe 10 is divided into sections (e.g., sections 10A-10H in the illustrated embodiment) with each section having a vertical height H and being capable of capacitively sensing a fluid level associated with that section.

The capacitive sensing aspect of each of probe sections 10A-10H is electrically coupled to an individual antenna (not shown in FIG. 1) housed within, for example, cover 30 used to close off/seal fill tube 108. Note that cover 30 need not be used to house these antennas as they could also be located in any other location that is accessible from outside of tank 100.

The electrical signal indicative of the capacitively sensed fluid level measured by each of sections 10A-10H is "read" by a magnetic field response recorder 40 that can be sized for hand-held operation such that it can be positioned over cover 30 by a user 200. Proper alignment of recorder 40 relative to cover 30 can be assured by mechanically coupling, keying, etc., recorder 40 to cover 30 as indicated generally by coupling keys 50. Briefly, each of the antennas (not shown) in cover 30 are "interrogated" by recorder 40. As will be explained further below, the results of the interrogation provide an indication of fluid level 106. The structure and operational concepts of recorder 40 are disclosed in detail in U.S. patent Publication No. 2005/0007239 (U.S. patent application Ser. No. 10/839,445), the contents of which are hereby incorporated by reference.

Figure 2:
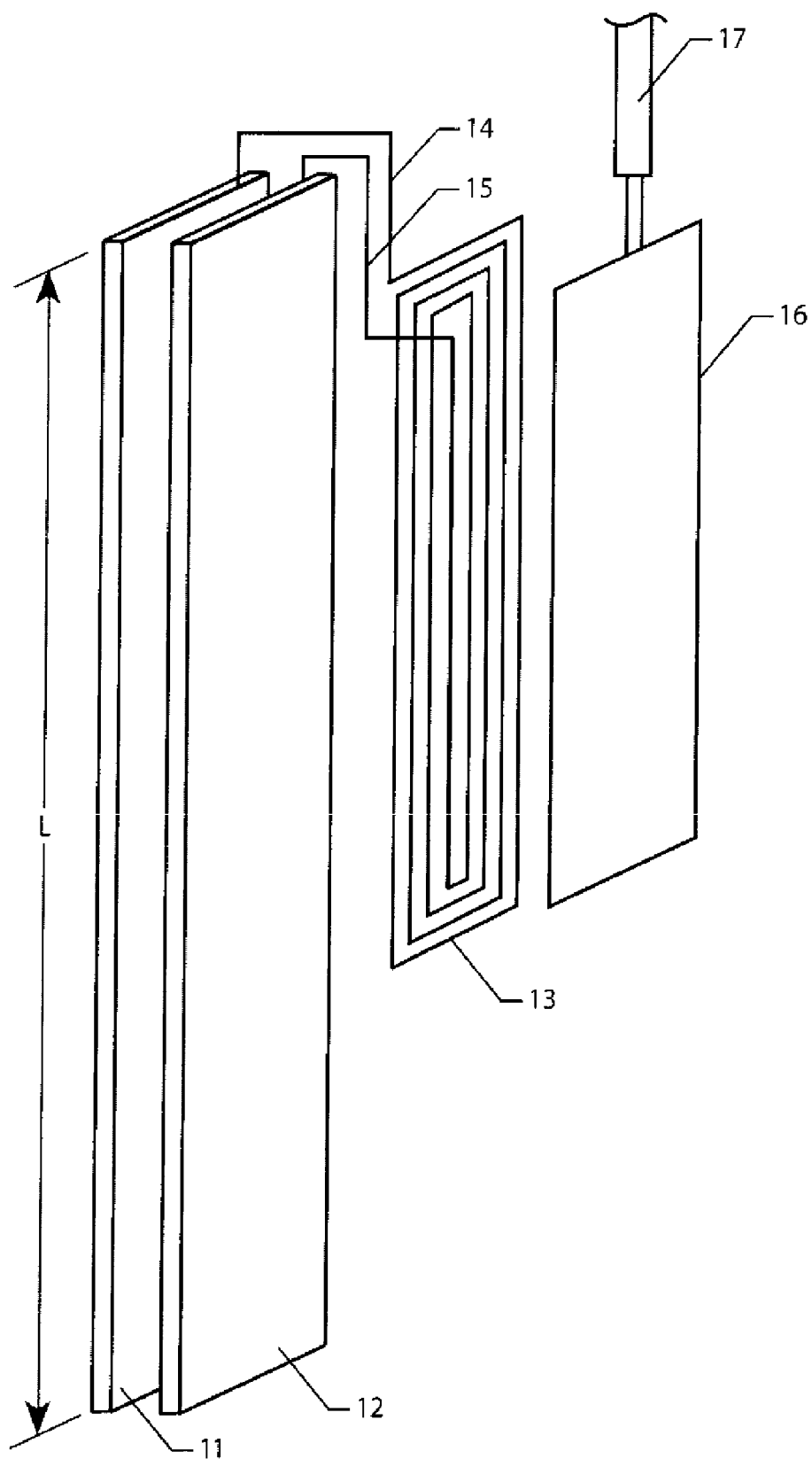
FIG. 2 is a schematic view of the electrical components of a single section of the present invention's fluid level sensing probe.

The basic electrical components of each of sections 10A-10H include the elements which are shown schematically in FIG. 2. Capacitor plates 11 and 12 are spaced apart from one another with the lengths L thereof substantially defining the vertical height H of a section 10A-10H. Each of plates 11 and 12 could be supported on an electrically non-conductive substrate (and/or encapsulated in an electrically non-conductive material) that is also chemically resilient to the fluid in tank 100. In general, plates 11 and 12 are mirror images of one another and can typically be rectangular as shown. However, the actual shape and dimensions of plates 11 and 12 can be tailored to satisfy application requirements such as capacitance sensitivity to a particular fluid, fluid level measurement resolution, etc. Plates 11 and 12 are electrically coupled to either end of a spiral inductor 13 via, for example, leads 14 and 15, respectively. Plates 11 and 12 form a capacitor that is part of a resonant circuit that includes inductor 13. An antenna 16 (e.g., a loop antenna as shown or a spiral inductor) is positioned in proximity to inductor 13 for inductive coupling thereto. An electrical conductor 17 (e.g., a coaxial cable) is coupled to antenna 16. Conductor 17 is used to carry electrical signals to/from antenna 16 as will be explained further below.

The above-described electrical components are mechanically mounted in a housing as will now be described with reference to FIGS. 3 and 4. For example, in the illustrated embodiment, a section's housing 18 can be a non-conductive and chemically-resilient solid material (i.e., a material impervious to the fluid in which it will be immersed, including chemical or cryogenic fluids) encasing plates 11 and 12, inductor 13, leads 14 and 15, antenna 16 and a portion of conductor 17. A bore 19 is formed in and through housing 18 all along the length thereof between plates 11 and 12. Bore 19 permits the fluid in the tank being monitored to flow therethrough with the fluid level in bore 19 being indicative of a capacitance sensed by plates 11 and 12 when a fluid level measurement is being taken. Orifices 18A can also be formed through housing 18 to communicate with bore 19 all along the length thereof in order to further facilitate fluid introduction into bore 19.

As will be explained further below, interrogation of each of sections 10A-10H involves inducing a magnetic field in a section's inductor 13. To reduce the influence on this magnetic field by plates 11 and 12, inductor 13 is positioned substantially perpendicular with respect to plates 11 and 12 as best shown in FIG. 3.

When sections 10A-10H are joined together to form probe 10, bore 19 from each section is aligned with bore 19 from adjacent sections so that the fluid level in probe 10 matches that of level 106 (FIG. 1). The mechanical coupling of two sections can be accomplished in a variety of ways without departing from the scope of the present invention. For example, such coupling could utilize a connection sleeve (not shown) at the interface between two sections, mechanical fasteners (not shown) to couple adjacent sections, fusion of sections, etc. Each section's conductor 17 can be led through or exterior to any of the sections being above same in probe 10. In either case, all of conductors 17 are led to cover 30. For clarity of illustration, only one such conductor 17 is shown being led to cover 30 in FIG. 1.

Figure 5:
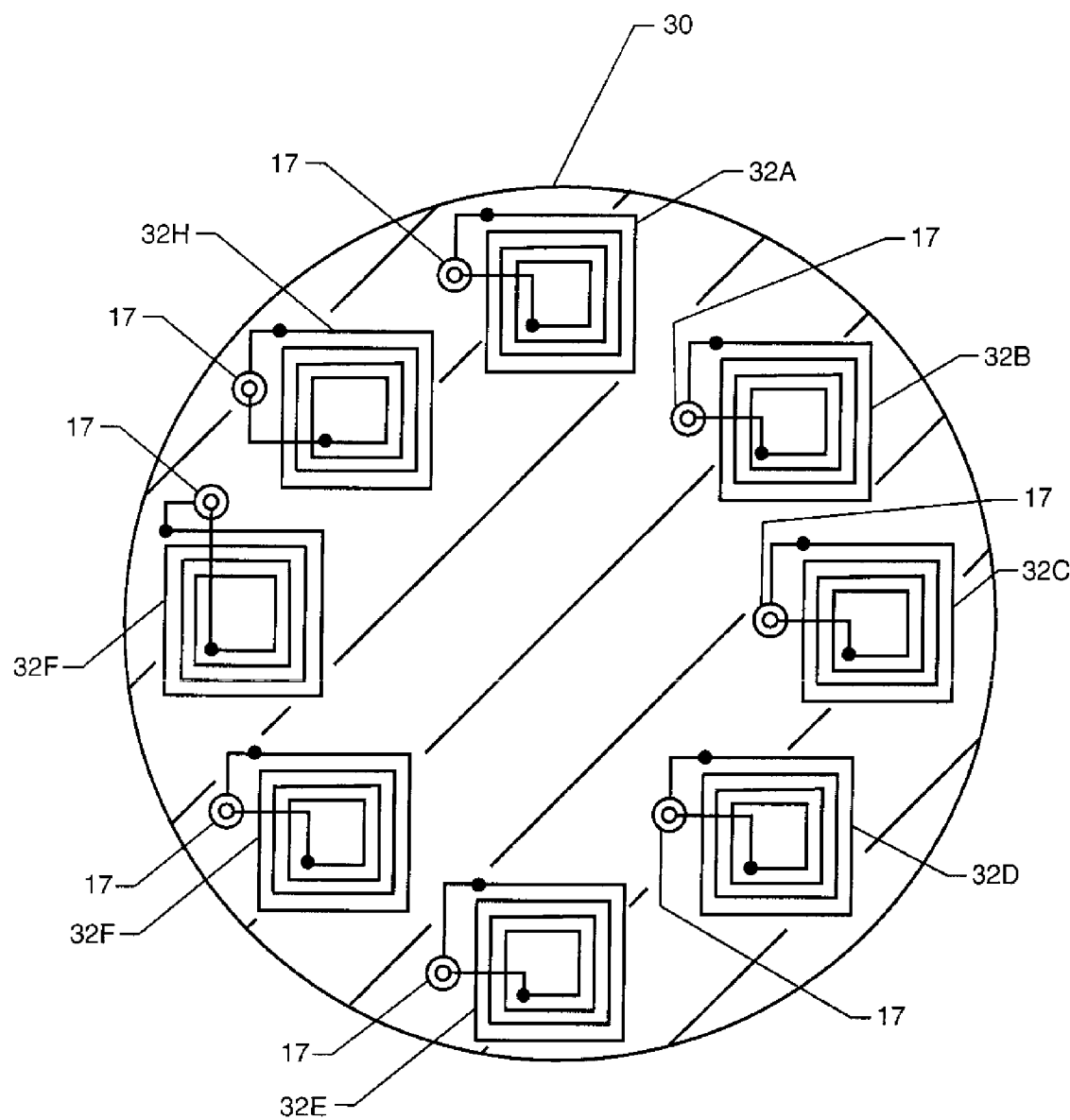
FIG. 5 is a cross-sectional view of the fuel tank's cover taken along lines 5-5 of FIG. 1 that illustrates the arrangement of antennas associated with the probe sections.

Referring now to FIG. 5, a cross-sectional view of cover 30 is shown. Cover 30 is made from an electrically non-conductive material that supports/houses/encases a number of antennas 32A-32H (e.g., spiral antennas to maximize magnetic energy coupling) with each conductor 17 coupled to a corresponding antenna. Accordingly, in the illustrated example, antennas 32A-32H correspond to sections 10A-10H. Note that more antennas can be provided in cover 30 to allow for a probe 10 having a greater number of probe sections. Further, if there is only one probe section, a single antenna could be provided in cover 30. In cases where cover 30 will bear weight or a load, it can be made from a chemically-resilient and load-bearing electrically non-conductive material.

Figure 6:
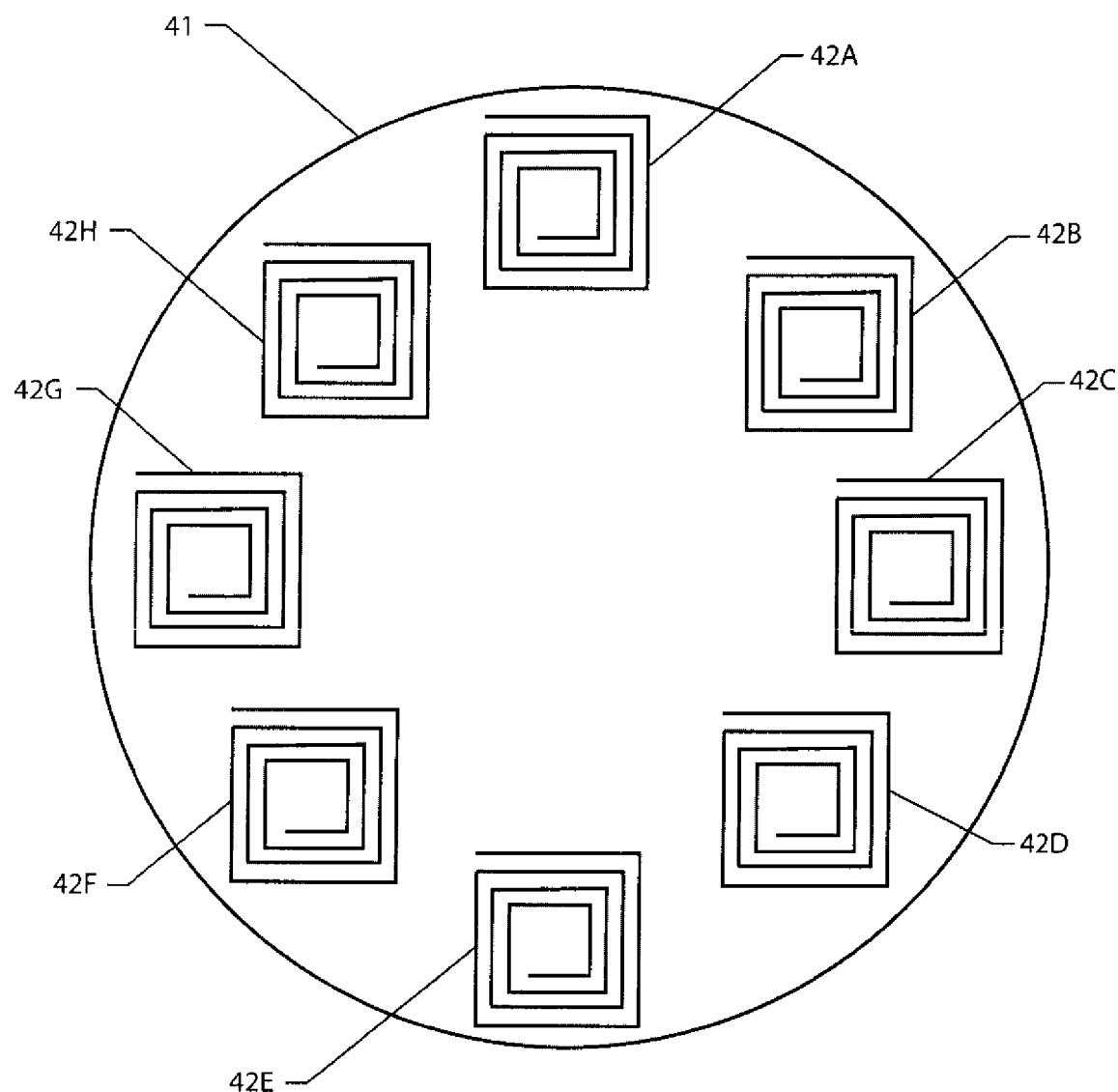
FIG. 6 is a plan view of the magnetic field response recorder's measurement head.

Antennas 32A-32H are arranged throughout cover 30 in a two-dimensional pattern. In a similar fashion, transceiving antennas 42A-42H (FIG. 6) are arrayed in the same two-dimensional pattern in the measurement head 41 of recorder 40. Electrical connections from the processing portion of recorder 40 to antennas 42A-42H has been omitted for clarity of illustration. Coupling keys 50 (FIG. 1) are provided so that when measurement head 41 is coupled to cover 30, antennas 32A and 42A are aligned with one another, antennas 32B and 42B are aligned with one another, etc.

In operation, when a fluid level measurement is to be taken, recorder 40 is coupled to and keyed to cover 30 via mechanical means such as coupling keys 50 (FIG. 1). A time varying electrical signal from magnetic field response recorder 40 is then inductively coupled from each of transceiving antennas 42A-42H to the corresponding one of antennas 32A-32H embedded in non-conductive cover 30. These signals are sent via the corresponding conductor 17 to the corresponding antenna 16 in one of sections 10A-10H. From each antenna 16, a time varying magnetic field is inductively coupled to the section's corresponding inductor 13. The magnetic field in each inductor 13 is transferred to the capacitor formed by the section's plates 11 and 12. The capacitor stores this energy as an electric field. The capacitor's electric field is then transferred back to the section's inductor 13. This back-and-forth energy transfer creates an oscillating time varying magnetic field having a frequency that is dependent on the value of the capacitor formed by plates 11 and 12. The value of the capacitor is dependent on the level of fluid (e.g., gasoline 104 in the illustrated embodiment) between each section's plates 11 and 12. Thus, the frequency of the back-and-forth energy transfer will change according to the level of fluid between plates 11 and 12. This frequency is in the form of a time varying magnetic field that is inductively coupled from each section's inductor 13 to its antenna 16. The signal picked-up by each antenna 16 is coupled to a corresponding one of antennas 32A-32H embedded in cover 30 which, in turn, is detected by the correspondingly aligned one of transceiving antennas 42A-42H of magnetic field response recorder 40. Fluid levels measured by each section 10A-10H are added to produce a total fluid level.

Figure 7A:
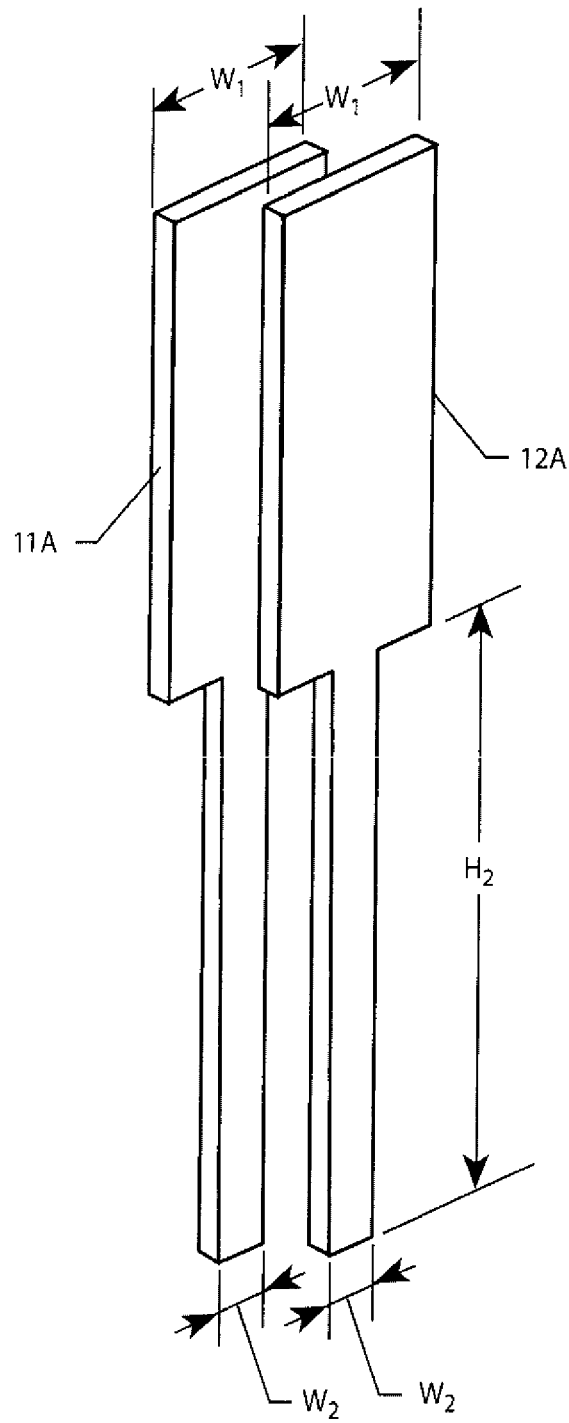
FIG. 7 is an isolated perspective view of a section's capacitive sensing plates configured for detecting and measuring the level of a second fluid in the fluid tank that has a substantially higher dielectric than a first fluid in the fluid tank.

As mentioned above, one or more sections of probe 10 could also be configured to detect the presence and/or level of another fluid in tank 100. By way of illustrative example, this embodiment of the present invention will be explained for the case of detecting water 110 that collects in the bottom of a tank of gasoline 104 as illustrated in FIG. 1. Since water is more dense than gasoline, one or more of the lowermost ones of sections 10A-10H can be modified to detect and measure water levels in the bottom of a gasoline tank. For example, it will be assumed that the critical water level can be measured within the height H of lowest section 10H (FIG. 1). The modification to detect the critical level of water involves replacing plates 11 and 12 of lowest section 10H with, for example, plates 11A and 12A shown in FIG. 7A. Plates 11A and 12A are parallel plates that are mirror images of one another.

The upper part of plates 11A and 12A have a width $W_1$ commensurate with that of all the remaining sections (i.e., sections 10A-10G) above section 10H. The lower part of plates 11A and 12A have a width $W_2$ that is narrower than $W_1$. The narrow portion of plates 11A and 12A is used to measure water. That is, since water is heavier than gasoline, the narrow portion of plates 11A and 12A are positioned at the bottom of a gasoline tank. These portions of plates 11A and 12A are narrower because water has a much higher dielectric constant than gasoline. As water fills the area between the regions of plates 11A and 12A of width $W_2$, the change in the total capacitance will be gradual due to the smaller capacitance of the narrow plate portions. Thus, water level readings can be accurately obtained if the water level does not exceed the height $H_2$. However, if the water level exceeds the height $H_2$ of the narrower width portion of plates 11A and 12A and contacts the portions of plates 11A and 12A of width $W_1$, the capacitance will change abruptly causing a capacitive shift that would be out of range of the sensor. The "out of range" condition can be used to trigger an alarm or other form of alert indicative of an unacceptable level of water in tank 100.

Figure 7B:
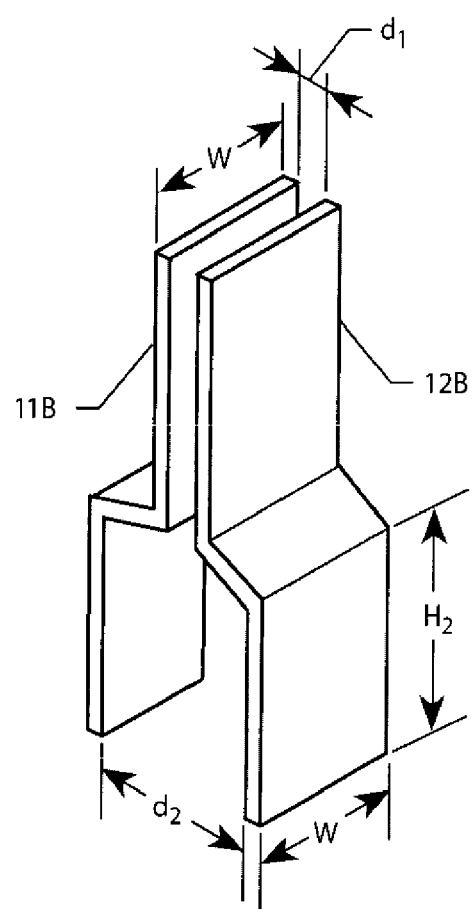

A similar result can be achieved by replacing plates 11 and 12 of lowest section 10H with, for example, plates 11B and 12B shown in FIG. 7B. Plates 11B and 12B have a constant width W with the upper part of plates 11B and 12B being separated by a gap $d_1$ while the lower part of plates 11B and 12B are separated by a larger gap $d_2$. The larger gap portion of plates 11B and 12B can be used to measure water's much higher dielectric constant.

In this example, air, fuel and water are stratified. Stratification of dielectrics in fuel tanks occurs when water vapor condenses. The density of the water is greater than that of the fuel, and the density of fuel is greater than that of air. The result is a natural stratification of the water, fuel and air. Water, fuel and air have very distinct dielectric constants of approximately 78, 4.5 and 1, respectively, such that a unique frequency corresponds to the interface location of two dielectrics.

The method presented here is valid as long as each probe section is exposed to no more than two dielectrics with the denser medium remaining in the lower portion of a probe section. Intermediate media (e.g., fuel in the illustrated example) will be exposed to the bottom of the highest probe section in the stack that it contacts. Similarly, the lower portion of the same media will be exposed to the top of the lowermost probe section that it contacts. The lowest density media will reside only in the higher probe sections in the stack. The scheme of measuring media stratification can be used for any number m of stratified media. For simplicity, the scheme will be described for constant width plates and a constant plate separation. The frequency for the n-th probe section is $$\omega_n = \left[\frac{L_n \varepsilon_0 w_n}{d_n}[l_n \kappa_n + (\kappa_{n+1} - \kappa_n)z_{n+1}]\right]^{-1/2}$$

where L is the inductance of the probe section;
$\varepsilon_0$ is the permitivity constant ($8.85 \times 10^{-12}$ F/m);
w is the width of the capacitor plates;
d is the separation between the plates;
l is the length of the plates;
$\kappa$ is the dielectric constant; and
z is the intermediate media level.
Thus, for the n-th probe section, $$z_{n+1} = \frac{1}{(\kappa_{n+1} - \kappa_n)}\left[\frac{d_n}{\omega_n^2 L_n \varepsilon_0 w_n} - \kappa_n l_n\right]$$

for
n=1,2, . . . , m−1
The level of each intermediate medium (n=2,3, . . . , m−1) is n-th level=$z_n$+($l_n$−$z_{n+1}$)
The most dense and least dense media have levels $z_m$ and $z_1$, respectively, measured from the bottom and top of the tank, respectively. The method discussed here provides a means to measure the levels of stratified media. Measurement of levels can be used as a means of determining if a media is within the tank. An example would be that by knowing the frequency of the lower probe section, one could determine if water was present and if so, how much.

The advantages of the present invention are numerous. A simple wireless system is provided to measure fluid level in a tank. Since all measurement readings are obtained by low-power magnetic induction, no power needs to be supplied to the level-sensing probe in the tank or to the antennas embedded in the tank's cover. This eliminates the chance for any electrical spark discharge in the vicinity of the tank. Further, a tank's cover need not be removed to measure fluid level, thereby preventing release of toxic fumes as well as preventing contamination of the fluid in the tank. Measurement readings can be collected in a variety of ways without departing from the scope of the present invention. For example, sensor sections could be interrogated in a bottom-to-top sequence or top-to-bottom sequence, or any other sequence provided the position of a probe section is known relative to the overall probe configuration. Measurement reading resolution can be improved simply by increasing the width of the (capacitor) plates used in each section.

Although the invention has been described relative to a specific embodiment thereof, there are numerous variations and modifications that will be readily apparent to those skilled in the art in light of the above teachings. For example, capacitor plates in the present invention could be replaced by interdigitated electrodes placed on a single substrate. Additionally, for use with granular or viscous fluids, the capacitor plates can be oriented such that their cross-section forms an acute angle with both plates meeting at a common edge. A nonconductive interface between the two plates would be used to avoid electrical contact between the plates. Another option would be to provide each probe section with a unique inductor (i.e., inductor 13) so that the frequency range (defined between no contact with the fluid to complete immersion in the fluid) of each probe section is unique. In this way, a single transceiving antenna could be used to interrogate antennas 32 in cover 30. It is therefore to

What is claimed as new and desired to be secured by Letters Patent of the United States is:

1. A system for measuring a fluid level in a tank, comprising:
    a level-sensing probe adapted to be positioned in a tank containing a fluid such that said probe substantially spans the height of the tank, said probe divided into a plurality of sections with each of said sections including (i) a fluid-level capacitive sensor disposed along the length thereof, (ii) an inductor electrically coupled to said capacitive sensor, (iii) a sensor antenna positioned for inductive coupling to said inductor, and (iv) an electrical conductor coupled to said sensor antenna;
    an electrically non-conductive housing adapted to be accessible from a position outside of the tank;
    a plurality of housing antennas arrayed in a pattern within said housing with each of said housing antennas electrically coupled to said electrical conductor from a corresponding one of said plurality of sections; and
    a magnetic field response recorder having a measurement head with a plurality of transceiving antennas arrayed therein to correspond to said pattern of housing antennas, said measurement head including means for mechanically coupling said measurement head to said housing wherein each of said housing antennas is substantially aligned with a specific one of said transceiving antennas.

2. A system as in claim 1 wherein said capacitive sensor associated with at least one of said sections is defined by capacitor plates of varying width.

3. A system as in claim 1 wherein said capacitive sensor associated with at least one of said sections is defined by capacitor plates separated by a varying gap.

4. A system as in claim 1 wherein said pattern is two-dimensional.

5. A system as in claim 1 wherein the tank has an opening used for filling the tank with the fluid, and wherein said housing is adapted to fit and cover the opening.

6. A system as in claim 1 wherein said magnetic field response recorder is hand-held.

7. A system as in claim 1 wherein each said inductor is a spiral inductor.

8. A system as in claim 7 wherein each said spiral inductor is positioned approximately perpendicular to said capacitive sensor corresponding thereto.

9. A system as in claim 1 wherein each said sensor antenna is a loop antenna.

10. A system as in claim 1 each of said housing antennas is a spiral antenna.

11. A system as in claim 1 wherein each of said transceiving antennas is a spiral antenna.

12. A system for measuring a fluid level in a tank, comprising:
    a level-sensing probe adapted to be positioned in a tank containing a fluid such that said probe substantially spans the height of the tank, said probe divided into a plurality of sections with each of said sections including (i) a section housing having a bore formed therethrough along the length thereof wherein said bore associated with each of said sections is aligned with said bore associated with adjacent ones of said sections, (ii) first and second electrically-conductive plates mounted in said section housing and disposed on either side of said bore substantially all along the length thereof, (iii) a spiral inductor mounted in said section housing and electrically-coupled in parallel to said first and second electrically-conductive plates, (iv) a sensor antenna mounted in said section housing and positioned for inductive coupling to said spiral inductor, and (v) an electrical conductor mounted in said section housing and coupled to said sensor antenna;
    an electrically non-conductive housing adapted to be accessible from a position outside of the tank;
    a plurality of housing antennas arrayed in a pattern within said housing with each of said housing antennas electrically coupled to said electrical conductor from a corresponding one of said plurality of sections; and
    a magnetic field response recorder having a measurement head with a plurality of transceiving antennas arrayed therein to correspond to said pattern of housing antennas, said measurement head including means for mechanically coupling said measurement head to said housing wherein each of said housing antennas is substantially aligned with a specific one of said transceiving antennas for inductive coupling thereto.

13. A system as in claim 12 wherein, for a lowest one of said sections in the tank, said first and second electrically-conductive plates are (i) mirror images of one another along the lengths thereof, and (ii) defined by two different widths along the lengths thereof.

14. A system as in claim 12 wherein, for a lowest one of said sections in the tank, said first and second electrically-conductive plates are (i) mirror images of one another along the lengths thereof, and (ii) separated by different gaps along the lengths thereof.

15. A system as in claim 12 wherein said pattern is two-dimensional.

16. A system as in claim 12 wherein the tank has an opening used for filling the tank with a fluid, and wherein said housing is adapted to fit and cover the opening.

17. A system as in claim 12 wherein said magnetic field response recorder is hand-held.

18. A system as in claim 12 wherein each said spiral inductor is positioned approximately perpendicular to said first and second electrically-conductive plates corresponding thereto.

19. A system as in claim 12 wherein each said sensor antenna is a loop antenna.

20. A system as in claim 12 each of said housing antennas is a spiral antenna.

21. A system as in claim 12 wherein each of said transceiving antennas is a spiral antenna.

22. A system for measuring a fluid level in a tank, comprising:
    a level-sensing probe adapted to be positioned in a tank containing a fluid such that said probe substantially spans the height of the tank, said probe divided into a plurality of sensing sections with each of said sensing sections including (i) a section housing made of a solid material inert with respect to the fluid and having a bore formed therethrough along the length thereof wherein said bore associated with each of said sensing sections is aligned with said bore associated with adjacent ones of said sensing sections, (ii) first and second electrically-conductive plates embedded in said section housing and disposed on either side of said bore substantially all along the length thereof, (iii) a spiral inductor embedded in said section housing, electrically-coupled in parallel to said first and second electrically-conductive plates, and disposed approximately perpendicular to said first and second electrically-conductive plates, (iv) a sensor antenna embedded in said section housing and positioned for inductive coupling to said spiral inductor, and (v) an electrical conductor embedded in said section housing and coupled to said sensor antenna;

an electrically non-conductive housing adapted to be fitted to and cover an opening used to fill the tank with the fluid;

a plurality of housing antennas arrayed in a two-dimensional pattern within said housing with each of said housing antennas electrically coupled to said electrical conductor from a corresponding one of said plurality of sensor sections; and a magnetic field response recorder having a measurement head with a plurality of transceiving antennas arrayed therein to correspond to said two-dimensional pattern of housing antennas, said measurement head including means for mechanically coupling said measurement head to said housing wherein each of said housing antennas is substantially aligned with a specific one of said transceiving antennas for inductive coupling thereto wherein said magnetic field response recorder can interrogate each of said sensing sections independently.

23. A system as in claim 22 wherein, for a lowest one of said sensing sections in the tank, said first and second electrically-conductive plates are (i) mirror images of one another along the lengths thereof, and (ii) defined by two different widths along the lengths thereof.

24. A system as in claim 22 wherein, for a lowest one of said sections in the tank, said first and second electrically-conductive plates are (i) mirror images of one another along the lengths thereof, and (ii) separated by different gaps along the lengths thereof.

25. A system as in claim 22 wherein said magnetic field response recorder is hand-held.

26. A system as in claim 22 wherein each said sensor antenna is a loop antenna.

27. A system as in claim 22 each of said housing antennas is a spiral antenna.

28. A system as in claim 22 wherein each of said transceiving antennas is a spiral antenna.

* * * * *